(12) United States Patent
Thomas

(10) Patent No.: US 12,081,004 B2
(45) Date of Patent: *Sep. 3, 2024

(54) WEATHERPROOF ELECTRICAL ENCLOSURE WITH REINFORCEMENT

(71) Applicant: Hubbell Incorporated, Shelton, CT (US)

(72) Inventor: Jason Peter Thomas, Mesa, AZ (US)

(73) Assignee: Hubbell Incorporated, Shelton, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/205,239

(22) Filed: Jun. 2, 2023

(65) Prior Publication Data

US 2023/0318274 A1 Oct. 5, 2023

Related U.S. Application Data

(63) Continuation of application No. 17/325,055, filed on May 19, 2021, now Pat. No. 11,710,952, which is a
(Continued)

(51) Int. Cl.
*H02G 3/08* (2006.01)
*F04D 25/08* (2006.01)
(Continued)

(52) U.S. Cl.
CPC .......... *H02G 3/083* (2013.01); *F04D 25/088* (2013.01); *F04D 29/601* (2013.01);
(Continued)

(58) Field of Classification Search
None
See application file for complete search history.

(56) References Cited

U.S. PATENT DOCUMENTS 1,270,296 A 6/1918 Jeune
2,414,173 A 1/1947 Schuman
(Continued)

OTHER PUBLICATIONS

3rd Chinese Office Action and Search Report mailed in CN 201880044860.1 on Nov. 29, 2021 (15 pages) with English translation.
(Continued)

*Primary Examiner* — Krystal Robinson
(74) *Attorney, Agent, or Firm* — Wissing Miller LLP

(57) ABSTRACT

The present disclosure provides descriptions of electrical box assemblies for supporting heavy fixtures, such as ceiling fans, and facilitating electrical connections to the fixtures. The electrical box assembly includes an electrical box that allows a connection between the box and electrical conduits and a connection, e.g., a weatherproof connection, with a housing of the fixture. The box has an open front face to house electrical connections between the fixture and wires supplying electrical power to the box via the conduits. The box has a bottom wall and an open front face. A reinforcement member fits within the electrical box and includes a panel shaped to conform to at least a portion of the bottom wall and one or more standoffs extending toward the open front face of the box. When the reinforcement member is positioned within the box, mounting holes in the bottom wall of the box and reinforcement member are aligned to allow the box to be attached to a building structure.

20 Claims, 15 Drawing Sheets

Related U.S. Application Data continuation of application No. 16/026,770, filed on Jul. 3, 2018, now Pat. No. 11,025,041.

(60) Provisional application No. 62/646,089, filed on Mar. 21, 2018, provisional application No. 62/528,659, filed on Jul. 5, 2017.

(51) Int. Cl.
  *F04D 29/60* (2006.01)
  *H02G 3/06* (2006.01)
  *H02G 3/10* (2006.01)
  *H02G 3/20* (2006.01)

(52) U.S. Cl.
  CPC ........... *H02G 3/0616* (2013.01); *H02G 3/086* (2013.01); *H02G 3/10* (2013.01); *H02G 3/20* (2013.01)

(56) References Cited

U.S. PATENT DOCUMENTS

| | | | |
|---|---|---|---|
| 2,861,121 A | 11/1958 | Isidore | |
| 3,474,994 A | 10/1969 | Swanquist | |
| 3,678,437 A | 7/1972 | Vaden | |
| 3,767,917 A | 10/1973 | Lampart | |
| 3,773,968 A | 11/1973 | Copp | |
| 3,836,766 A | 9/1974 | Auerbach | |
| 3,873,757 A | 3/1975 | Berke et al. | |
| 3,877,601 A * | 4/1975 | Evans | H02G 3/081 220/3.3 |
| 4,023,697 A | 5/1977 | Marrero | |
| 4,050,603 A | 9/1977 | Harris et al. | |
| 4,064,427 A | 12/1977 | Hansen et al. | |
| 4,082,915 A * | 4/1978 | Silver | H02G 3/083 174/665 |
| 4,218,581 A | 8/1980 | Suzuki | |
| 4,331,832 A * | 5/1982 | Curtis | H02G 3/185 220/3.7 |
| 4,424,553 A | 1/1984 | Marsocci et al. | |
| 4,599,484 A | 7/1986 | Bramwell | |
| 4,634,345 A | 1/1987 | Stanek et al. | |
| 4,733,330 A | 3/1988 | Tanaka et al. | |
| 4,788,383 A | 11/1988 | Caison | |
| 4,919,292 A * | 4/1990 | Hsu | H02G 3/20 248/343 |
| 5,034,869 A | 7/1991 | Choi | |
| 5,183,233 A | 2/1993 | LaPalomento | |
| 5,239,132 A * | 8/1993 | Bartow | H02G 3/12 220/3.6 |
| 5,303,894 A * | 4/1994 | Deschamps | H02G 3/125 411/433 |
| 5,382,752 A | 1/1995 | Reyhan et al. | |
| 5,407,088 A * | 4/1995 | Jorgensen | H02G 3/20 220/3.9 |
| 5,655,865 A | 8/1997 | Plank et al. | |
| 5,677,512 A * | 10/1997 | Reiker | H02G 3/081 220/3.9 |
| 5,762,223 A | 6/1998 | Kerr, Jr. | |
| 5,854,443 A * | 12/1998 | Reiker | H02G 3/20 174/58 |
| 5,860,548 A * | 1/1999 | Kerr, Jr. | H02G 3/10 220/3.6 |
| 5,883,331 A * | 3/1999 | Reiker | H02G 3/126 248/205.3 |
| 5,900,583 A | 5/1999 | Russo | |
| 5,907,124 A * | 5/1999 | Reiker | H02G 3/20 220/3.9 |
| 5,947,436 A | 9/1999 | Bucher et al. | |
| 5,975,853 A | 11/1999 | Lackey | |
| 5,995,380 A | 11/1999 | Maue et al. | |
| 6,207,894 B1 * | 3/2001 | Reiker | E04B 9/006 52/220.8 |
| 6,207,898 B1 * | 3/2001 | Reiker | H02G 3/126 220/3.9 |
| 6,281,439 B1 | 8/2001 | Reiker | |
| 6,335,486 B1 * | 1/2002 | Reiker | E04B 9/006 174/51 |
| 6,361,193 B1 | 3/2002 | Gabrius et al. | |
| 6,364,511 B1 | 4/2002 | Cohen | |
| 6,634,901 B2 | 10/2003 | Kerr, Jr. | |
| 6,661,563 B2 | 12/2003 | Hayashi et al. | |
| 6,677,519 B2 | 1/2004 | Rumsey et al. | |
| 6,734,356 B1 * | 5/2004 | Gretz | F04D 25/088 174/53 |
| 6,777,615 B1 | 8/2004 | Gretz | |
| 6,965,077 B2 | 11/2005 | Halbert | |
| 6,997,740 B2 | 2/2006 | Kerr | |
| 7,053,296 B2 | 5/2006 | Drane et al. | |
| 7,232,336 B1 * | 6/2007 | Evans | H02G 3/086 439/537 |
| 7,336,165 B2 | 2/2008 | Fuchs | |
| 7,586,039 B1 * | 9/2009 | Gretz | H02G 3/123 174/53 |
| 7,678,993 B2 | 3/2010 | Jolly | |
| 8,404,971 B1 * | 3/2013 | Gretz | H02G 3/123 174/53 |
| 8,544,807 B2 | 10/2013 | Foreman | |
| 8,724,832 B2 | 5/2014 | Stephanou et al. | |
| 9,196,887 B2 | 11/2015 | Sasada et al. | |
| 9,366,418 B2 | 6/2016 | Gifford | |
| 9,435,353 B1 | 9/2016 | Gretz | |
| 9,466,962 B1 | 10/2016 | Gretz | |
| 9,593,687 B2 | 3/2017 | Iwamoto et al. | |
| 9,702,533 B1 | 7/2017 | Harpenau et al. | |
| 9,831,648 B1 | 11/2017 | Gretz | |
| 9,887,524 B1 | 2/2018 | Gretz | |
| 9,897,095 B2 | 2/2018 | Botkin | |
| 10,014,510 B2 | 7/2018 | Ichikawa et al. | |
| 10,026,943 B2 | 7/2018 | Ichikawa et al. | |
| 10,027,099 B1 | 7/2018 | Garvin | |
| 10,295,163 B1 | 5/2019 | Cohen | |
| 10,320,171 B1 | 6/2019 | Galasso et al. | |
| 10,326,247 B2 | 6/2019 | Kohen | |
| 10,367,317 B1 | 7/2019 | Rahner | |
| 10,530,140 B2 | 1/2020 | Drane | |
| 11,025,041 B2 | 6/2021 | Thomas | |
| 11,050,230 B1 * | 6/2021 | Gretz | E04B 9/006 |
| 11,710,952 B2 | 7/2023 | Thomas | |
| 2001/0000768 A1 * | 5/2001 | Robinson | H01R 13/113 439/517 |
| 2001/0010985 A1 | 8/2001 | Kasai | |
| 2002/0011345 A1 | 1/2002 | Reiker | |
| 2002/0066845 A1 | 6/2002 | Pitlor | |
| 2002/0163812 A1 | 11/2002 | Tseng | |
| 2002/0197910 A1 | 12/2002 | Kerr | |
| 2003/0138291 A1 | 7/2003 | Hixon | |
| 2003/0148659 A1 | 8/2003 | Walker et al. | |
| 2004/0004173 A1 | 1/2004 | Johnson | |
| 2004/0005218 A1 | 1/2004 | Marshall | |
| 2004/0033713 A1 | 2/2004 | Chang | |
| 2004/0168820 A1 | 9/2004 | Kanamori et al. | |
| 2005/0000716 A1 | 1/2005 | Halbert | |
| 2006/0278632 A1 | 12/2006 | Tai | |
| 2006/0278766 A1 | 12/2006 | Wang | |
| 2011/0240363 A1 | 10/2011 | Dinh | |
| 2012/0328920 A1 | 12/2012 | Takase et al. | |
| 2013/0161053 A1 | 6/2013 | Okamoto et al. | |
| 2014/0000956 A1 | 1/2014 | Wurms | |
| 2014/0212732 A1 | 7/2014 | Ichikawa et al. | |
| 2014/0318853 A1 | 10/2014 | Korcz et al. | |
| 2014/0370343 A1 | 12/2014 | Nomoto et al. | |
| 2015/0068802 A1 | 3/2015 | Kajiwara | |
| 2016/0172652 A1 | 6/2016 | Ichikawa et al. | |
| 2017/0047717 A1 | 2/2017 | Thomas | |
| 2019/0013658 A1 * | 1/2019 | Thomas | H02G 3/0616 |

OTHER PUBLICATIONS

International Search Report and Written Opinion mailed in corresponding PCT/2018/040750 on Dec. 27, 2018. (12 pages).

(56) References Cited

OTHER PUBLICATIONS

Arlington Brochure for "Non-Metallic Rain Box (TM)", 2014, (1 page).
Chinese Office Action mailed in CN 201880044860.1 on Oct. 29, 2020 (18 pages).
2nd Chinese Office Action mailed in CN 201880044860.1 on May 14, 2021 (12 pages).
International Preliminary Report on Patentabiliity mailed in corresponding PCT/US2018/040750 on Mar. 12, 2020 (8 pages).

* cited by examiner

WEATHERPROOF ELECTRICAL ENCLOSURE WITH REINFORCEMENT

CROSS-REFERENCE TO RELATED APPLICATIONS

This application is a continuation of co-pending application Ser. No. 17/325,055 filed May 19, 2021 which is a continuation of co-pending application Ser. No. 16/026,770, filed Jul. 3, 2018, which claims priority to U.S. Provisional Application Ser. No. 62/528,659 filed Jul. 5, 2017 and to U.S. Provisional Application Ser. No. 62/646,089 filed Mar. 21, 2018 the contents of each application are incorporated herein in their entirety by reference.

BACKGROUND

Field

The present disclosure relates generally to electrical boxes. More particularly the present disclosure relates to electrical boxes made of non-conductive materials and a reinforcement member to support ceiling fans and other heavy fixtures.

Description of the Related Art

Connection of ceiling-mounted electrical fixtures, such as ceiling fans, chandeliers and the like, is typically accomplished by installing an electrical box to a structural member within the ceiling, connecting electrical conduits to the box, mechanically attaching the fixture to the electrical box, and electrically connecting the fixture to wires running through the conduit. The box provides a means for connection with the conduit, the ceiling and the fixture, and supports the weight of the fixture and securely holds the fixture in place during use. In the case of ceiling fans, the electrical box may need to support the fan against torque generated as the fan is rotated.

Electrical fixtures may be designed to be mounted in outdoor and/or indoor environments. In outdoor environments, such fixtures may include a weatherproof housing that limits moisture, dust, pests, and other outdoor hazards from the mechanism and circuitry of the device. To reliably provide connection to such devices, the electrical box itself may need to be weatherproof.

Ceiling fans are relatively heavy, compared with other electrical fixtures, such as lighting fixtures. In addition, ceiling fans generate torque. To support the additional weight of the ceiling fan and to securely support the ceiling fan, the electrical box needs to have sufficient mechanical strength. Plastic electrical boxes constructed from molded polymers may lack sufficient strength to support heavy electrical fixtures. Strength may be provided by constructing the electrical box from metal, such as steel or heavy gauge aluminum. To create a weatherproof metal electrical box, joints between metal panels, for example, joints between edges of folded sections of the box, must be sealed. Likewise, connections to conduits may need to include sealing structures, such as O-rings, to make them weatherproof. Forming an electrical box from metal and sealing it may be complex and more expensive than using plastic electrical boxes.

SUMMARY

The present disclosure provides descriptions of embodiments for ceiling mounted electrical box assemblies used to support relatively heavy electrical fixtures, such as ceiling fans. The present disclosure provides descriptions of ceiling fan kits that incorporate an electrical box assembly of the present disclosure and a ceiling fan. The electrical box assemblies of the present disclosure are made of a non-conductive electrical box and a reinforcement member that provides mechanical strength to support the weight of the electrical fixture and to resist torque or other forces generated when the electrical fixture is operated.

In one embodiment, the electrical box assembly includes an electrical box and a reinforcement member. The electrical box has a bottom wall with a mounting zone and an open front face. The reinforcement member has a panel and one or more standoffs extending from the panel. The panel is shaped to conform to at least a portion of the bottom wall of the box so that the panel can be positioned within the electrical box adjacent the bottom wall. The one or more standoffs extend toward the front face of the box and include at least one connecting hole configured to receive a fastener of the fixture.

In another embodiment, the electrical box assembly includes an electrical box, a reinforcement member and a shroud. The electrical box has a bottom wall with a mounting zone and an open front face. The reinforcement member has a panel and one or more standoffs extending from the panel. The panel is shaped to conform to at least a portion of the bottom wall of the box so that the panel can be positioned within the electrical box adjacent the bottom wall. The one or more standoffs extend toward the front face of the box and include at least one connecting hole configured to receive a fastener of the fixture. The shroud is configured to be connected with the front face of the box. More specifically, the electrical box may include a first mating surface on the open front face and the shroud may include a corresponding second mating surface such that when joined the first and second mating surfaces create a weatherproof engagement.

In one embodiment, a ceiling fan kit includes an electrical box assembly and a ceiling fan assembly. The electrical box assembly includes an electrical box and a reinforcement member. The electrical box has a bottom wall with a mounting zone and an open front face. The reinforcement member has a panel and one or more standoffs extending from the panel. The panel is shaped to conform to at least a portion of the bottom wall of the box so that the panel can be positioned within the electrical box adjacent the bottom wall. The one or more standoffs extend toward the front face of the box and include at least one connecting hole configured to receive a fastener of the fixture. The ceiling fan assembly includes a ceiling fan and a ceiling fan mounting bracket.

BRIEF DESCRIPTION OF THE DRAWINGS

The figures depict embodiments for purposes of illustration only. One skilled in the art will readily recognize from the following description that alternative embodiments of the structures illustrated herein may be employed without departing from the principles described herein, wherein:

FIG. 5b is a detailed perspective view of a portion of the electrical box assembly of FIG. 5a;

DETAILED DESCRIPTION

The present disclosure provides descriptions of embodiments for a weatherproof electrical box assembly having an electrical box and a reinforcement member for supporting and facilitating electrical connections to ceiling mounted electrical fixtures. The electrical box assemblies according to the present disclosure may be referred to herein as the "box assembly" in the singular and the "box assemblies" in the plural. The electrical box may be referred to as the "box" in the singular and the "boxes" in the plural. The electrical fixtures contemplated by the present disclosure include ceiling fans, chandeliers and other electrical fixtures that are heavy and/or require additional structural strength to support the electrical fixture when installed. The electrical fixtures may be referred to herein as the "fixture" in the singular and as the "fixtures" in the plural. This specification and the accompanying drawings are to be regarded in an illustrative sense rather than a restrictive sense. Various modifications may be made thereto without departing from the spirit and scope of the present disclosure.

Figure 1:
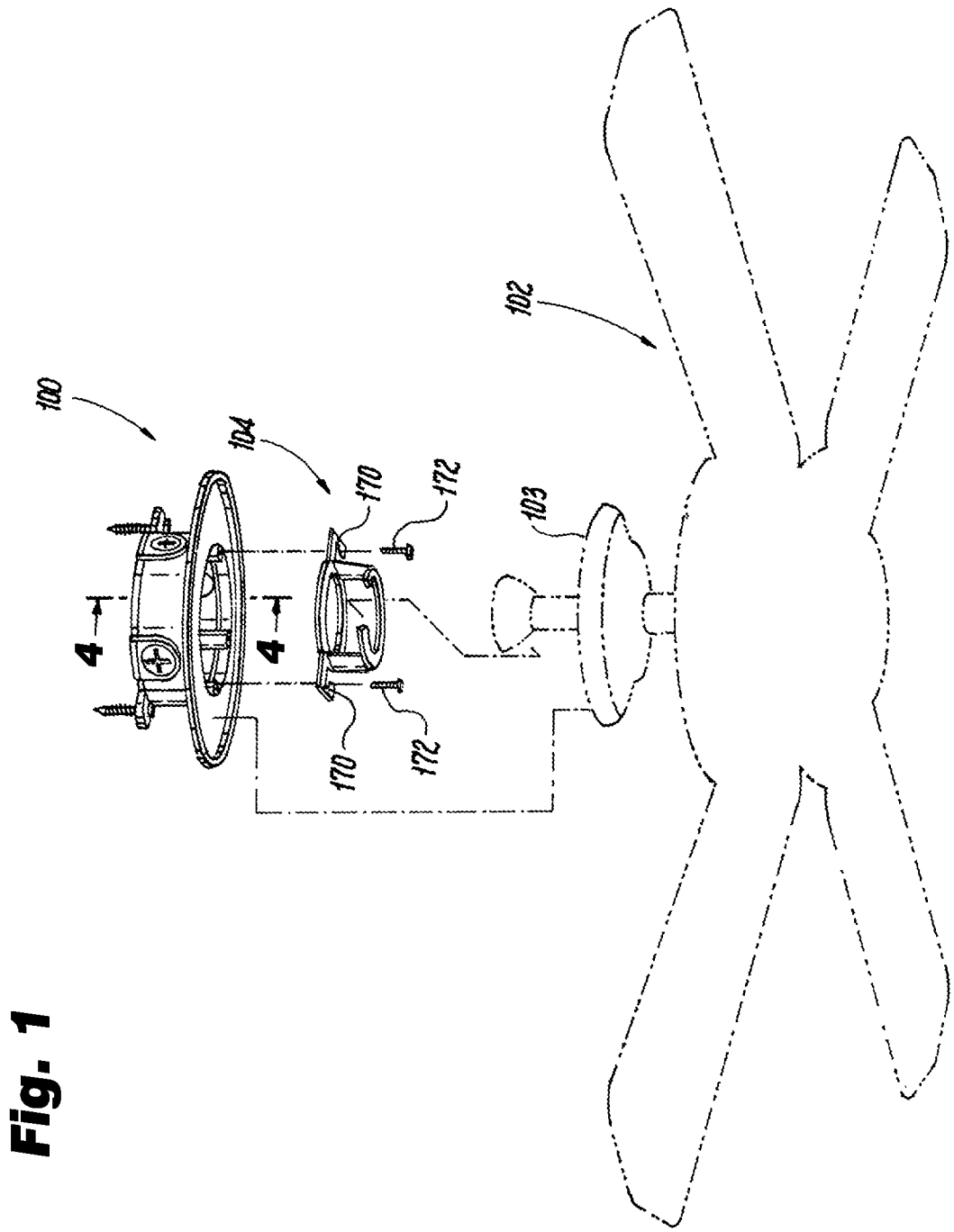
FIG. 1 is an exploded perspective view of a ceiling fan engaged with an electrical box assembly according to an exemplary embodiment of the disclosure.
Figure 2A:
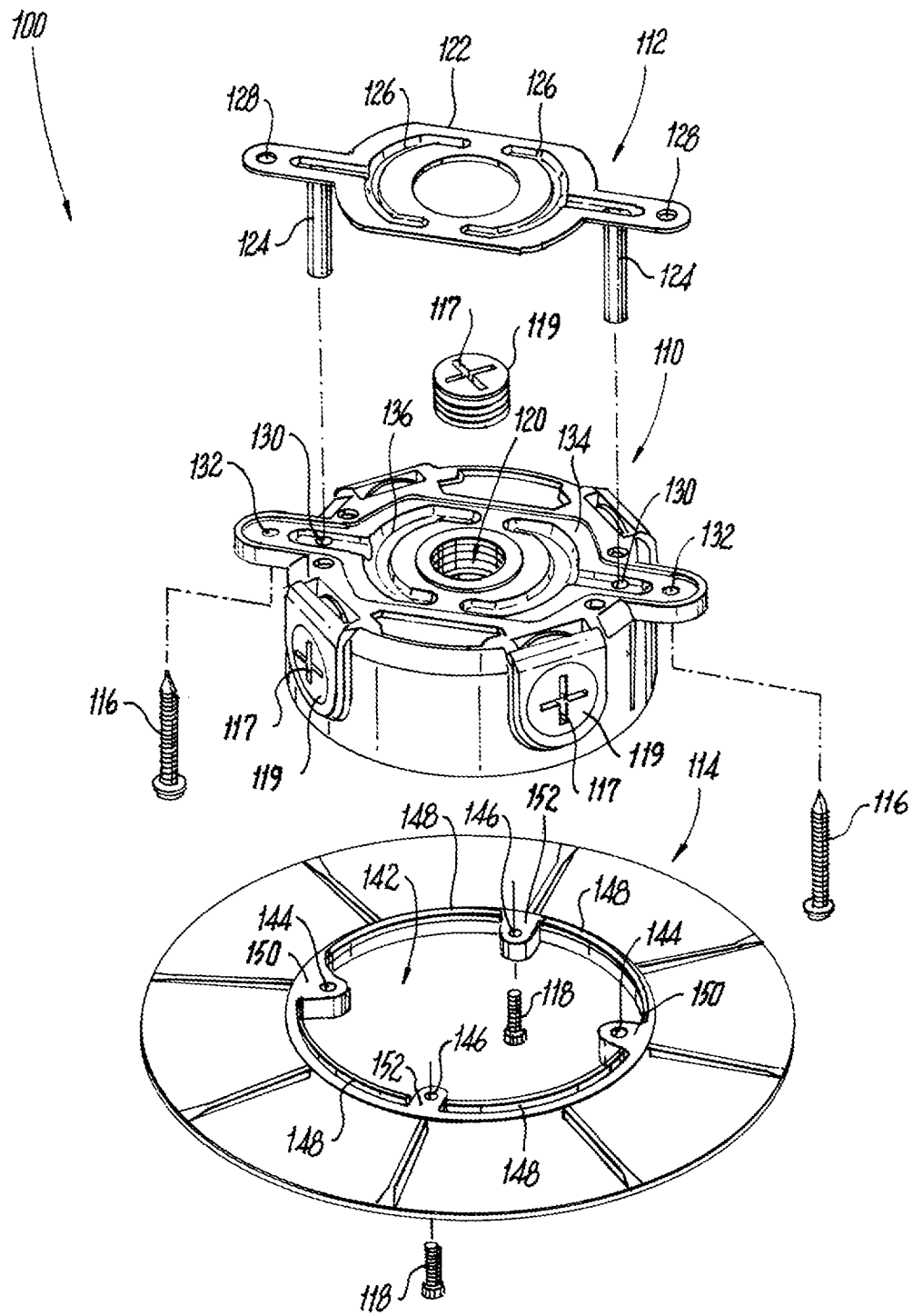
FIG. 2a is an upper perspective view with parts separated of the electrical box assembly of FIG. 1, illustrating an electrical box, a reinforcement member and an optional shroud.
Figure 2B:
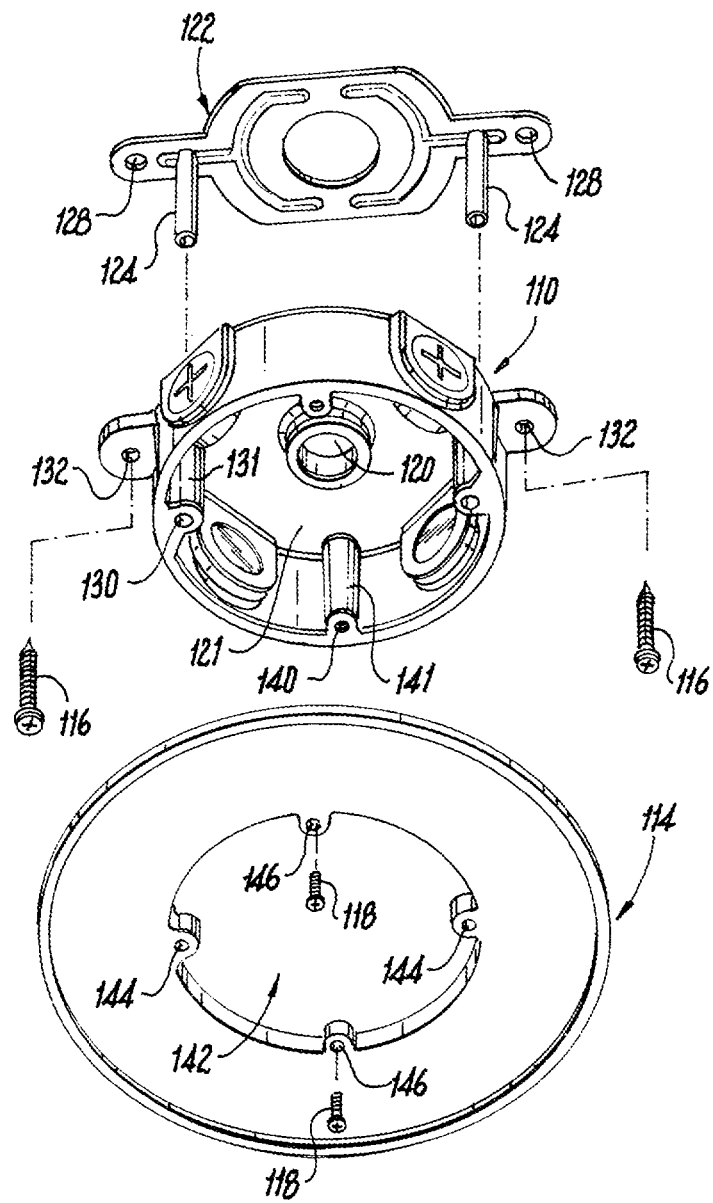
FIG. 2b is a lower perspective view of the electrical box assembly of FIG. 1, illustrating the electrical box, reinforcement member and optional shroud.

Referring to FIGS. 1, 2a and 2b, a fixture 102 is connected by a bracket 104 with an electrical box assembly 100 according to an embodiment of the present disclosure. The box assembly 100 includes an electrical box 110, e.g., a molded polymer box, a reinforcement member 112, and an optional shroud 114. Lag screws 116 are used to connect the box assembly 100 with a building structure, as will be described below. Screws 118 connect the shroud 114 with the electrical box 110. The box assembly 100 is secured to a building structure, e.g., a ceiling joist 10 seen in FIGS. 7 and 8, to fix the box 110 in position relative to the building structure, to support the fixture 102 and to facilitate electrical connections to the fixture.

Figure 8:
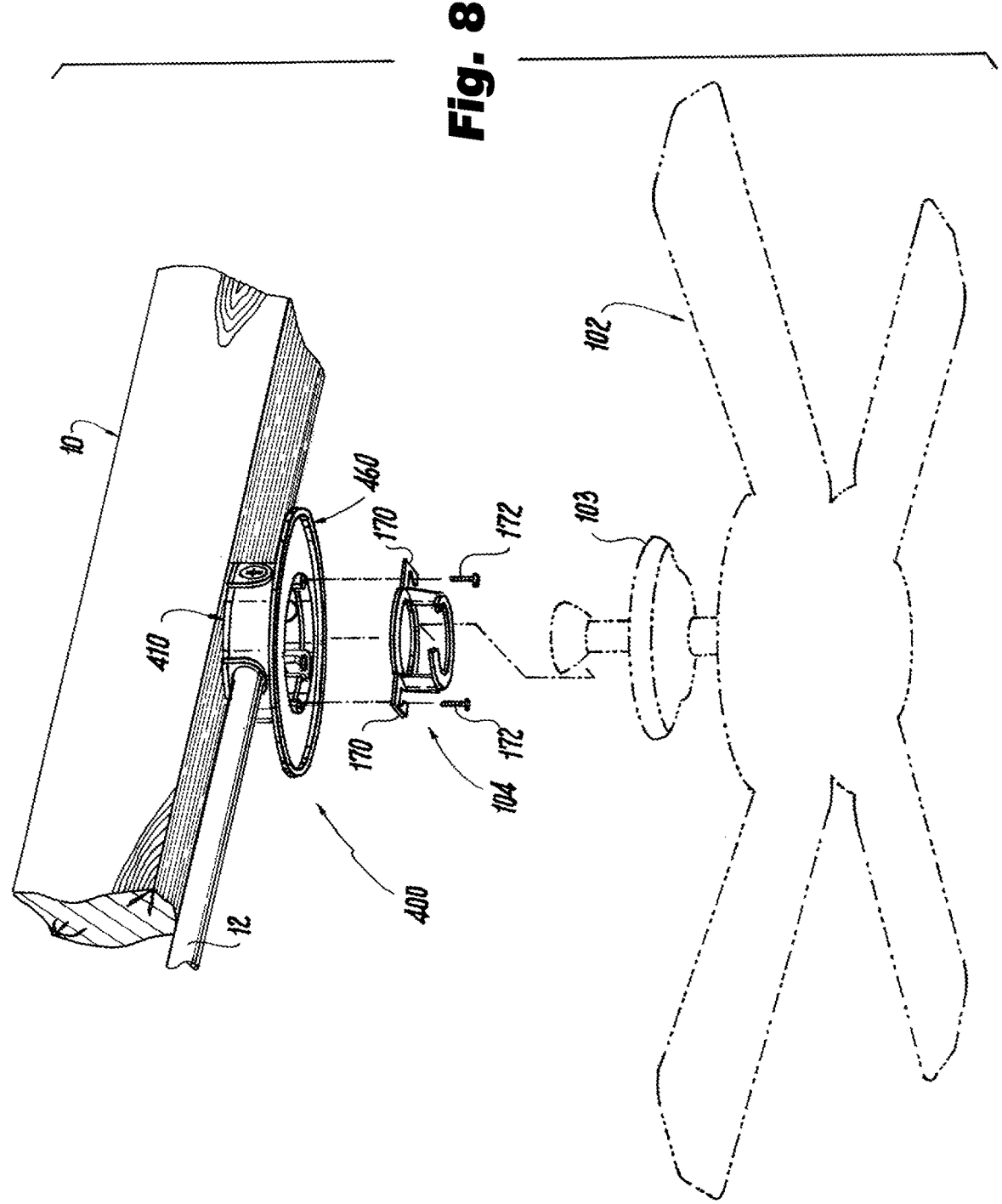
FIG. 8 is a perspective view with parts separated of another exemplary embodiment of electrical box assembly according to the present disclosure, illustrating the electrical box assembly attached to a ceiling joist, an electrical conduit attached to the electrical box assembly and a ceiling fan positioned to be attached to the electrical box assembly.

The box 110 includes conduit openings 120 used to create a weatherproof connection between the box 110 and an electrical conduit 12, seen in FIG. 8. The conduit openings 120 may be provided at various locations on the box 110 to facilitate convenient connection with conduits in a number of directions including through the upper surface of the box 110. As shown in FIG. 2b, the face 121 of the box 110 is open, allowing an installer access to the inside of the box 110 during installation.

Conduit openings 120 may be provided with removable plugs 119 that form weatherproof closures for the openings. An installer selects which conduit openings 120 are most conveniently located with regard to the conduits being connected with the box and removes the plugs only from those openings. The remaining plugs 119 maintain a weatherproof connection with the box 110. According to the embodiment shown in FIGS. 2a and 2b, openings 120 are provided with threads along their inner circumference. The threads connect either plugs 119 or conduits with the box 110. A screwdriver slot 117 is provided on the surface of the plug 119 so that the installer can unscrew the plug from the box 110. According to another embodiment, openings 120 have a smooth inner circumference and plugs 119 form a weatherproof frictional engagement with the openings 120. According to this exemplary embodiment, conduits may likewise form a frictional engagement with openings 120 and/or conduits may be bonded with openings 120 with an adhesive.

Figure 2C:
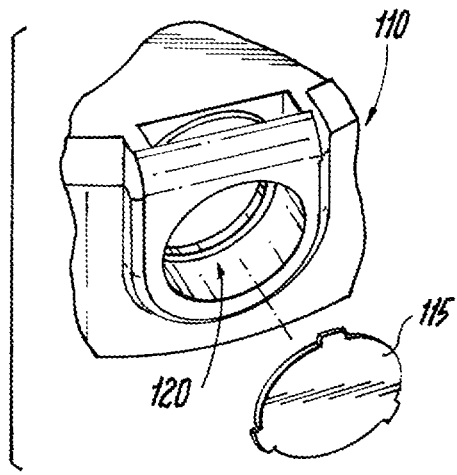
FIG. 2c is a detailed perspective view of another exemplary embodiment of a portion of the electrical box of FIGS. 2a and 2b.

According to another exemplary embodiment shown in FIG. 2c, instead of plugs 119, the openings 120 are each provided with a knock-out panel 115. The person installing the box 110 can remove the knock-out panels 115 at locations convenient to connect the box 110 with a conduit. Other knock-out panels are left intact to provide a weatherproof enclosure.

According to one embodiment, the box 110 is formed from a moldable non-conductive or electrically insulating material. A non-limiting example of a moldable non-conductive or electrically insulating material is plastic. Non-limiting examples of suitable plastic materials include moldable polymer resin, such as polyvinyl chloride (PVC), nylon, polyethylene terephthalate (PET), polybutylene terephthalate (PBT), and the like.

As shown in FIGS. 2a and 2b, an exemplary embodiment of a reinforcement member according to the present disclosure is shown. The reinforcement member 112 includes a panel 122 and standoffs 124 extending from the panel. The panel 122 may be made of a metal or metal alloy, such as steel, aluminum, copper, brass, bronze, and the like. According to one embodiment, the panel 122 is formed from 0.045" cold-rolled steel. The panel 122 may include ribs 126 to provide stiffness to the panel 122, and mounting holes used when mounting the box 110 to a building structure. The mounting holes 128 are provided at the ends of the panel 122. According to one embodiment, panel 122 is stamped from a sheet of material and the ribs 126 and mounting holes 128 are formed as part of the stamping process.

Continuing to refer to FIGS. 2a and 2b, the standoffs 124 may be made of a metal or metal alloy, such as steel, aluminum, copper, brass, bronze, and the like and may be made from the same material as the panel 122 or from a different material. According to one embodiment, the standoffs 124 are connected with the panel 122 by welding, riveting, or press fitting. The standoffs 124 are hollow and are threaded along their inner surface. The standoffs 124 are provided to facilitate the transfer of the load of a fixture mounted to the box 110 to the reinforcement member 112. The standoffs 124 also provide rigidity to the standoff holes through which the standoffs are inserted. More specifically, the box 110 includes standoff holes 130 extending from the upper surface of the box 110, seen in FIG. 2a, through bosses 131 to the face 121 of the box, seen in FIG. 2b. The standoff holes 130 are positioned on the box 110 to align with standoffs 124 extending from the panel 122. In an exemplary embodiment, the diameter of the standoff holes 130 forms an interference fit with the outer surface of the standoffs 124 so that when the standoffs 124 are inserted into the standoff holes 130, the reinforcement member 112 is removably fixed to the box 110. With this interference fit, the standoffs 124 also provide the additional structural rigidity to the bosses 131 as noted above. The box 110 also includes mounting holes 132 that align with mounting holes 128 of the reinforcement member 112 when the standoffs 124 are inserted into the standoff holes 130.

Continuing to refer to FIG. 2a, the box 110 includes a debossed area 134 on its upper surface that is shaped to conform with the panel 122 of the reinforcement member 112. When the reinforcement member 112 is connected with the box 110, the panel 122 fits within the debossed area 134 so that the upper surface of the panel 122 is flush with the upper surface of the box 110. The debossed area 134 may include grooves 136 shaped to accommodate ribs 126 formed in the panel 122. This configuration allows the box assembly 100 to be mounted with its upper surface flush to a building structure, such as the underside of a ceiling joist. When the reinforcement member 112 is fitted onto the box 110, the mounting holes 128 on the panel 122 and the mounting holes 132 on the box 110 are aligned. Lag screws 116 can then pass though the aligned mounting holes and engage with the building structure that will support the fixture, such as fan 102, seen in FIG. 1.

As shown in FIG. 2b, the box 110 may also include shroud mounting holes 140 formed in bosses 141. According to one embodiment, the ends of the bosses 141 are flush with the face 121 of the box 110. In the exemplary embodiment shown, the shroud 114 forms an annular ring with an opening 142. The opening is shaped to correspond with the open face 121 of the box 110. Arranged around the opening 142 are bracket mount holes 144 and shroud mount holes 146. As shown in FIG. 2a, a plurality of ridges 148 extend partially around opening 142. The ridges 148 are separated by gaps 150 and 152 corresponding to holes 144 and 146, respectively. According to one embodiment, the gaps 150 and 152 are of different lengths along the circumference of opening 142. The present disclosure also contemplates that the gaps may have the same length.

Figure 3A:
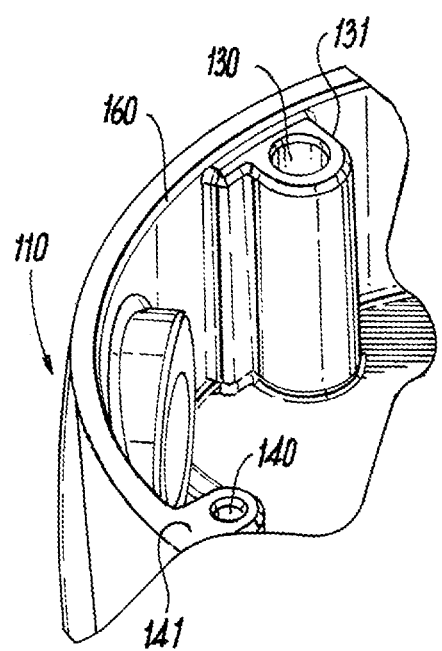
FIG. 3a is detailed perspective view of a portion of the electrical box of FIGS. 2a and 2b.
Figure 3B:
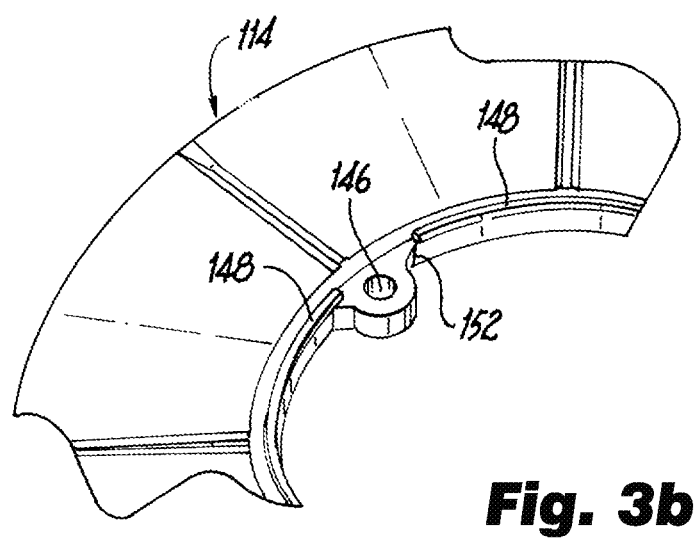
FIG. 3b is a detailed perspective view of a portion of the shroud of FIGS. 2a and 2b.
Figure 4:
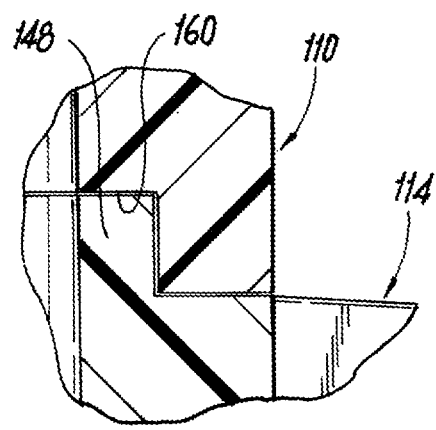
FIG. 4 is a partial cross-sectional view of an engagement between the electrical box and shroud of FIGS. 2a and 2b.

Referring to FIG. 4, a cross-section showing the joint between the shroud 114 and the box 110 when the shroud and box are mounted together is shown. The ridge 148 of the shroud 114 engages with a shoulder 160 along the inner circumference of the face 121 of the box 110. Engagement of the rib 148 and shoulder 160 provides a weatherproof interlocking engagement between the shroud 114 and box 110. As shown in FIGS. 2a and 2b, the gaps 152 are positioned adjacent bosses 141 when the shroud 114 is joined with the box 110. As shown in FIGS. 3a and 3b, each gap 152 is sized to correspond to the width of a boss 141 in the circumferential direction around the face 121 of the box 110. Likewise, the gaps 150 are positioned adjacent bosses 131. Each gap 150 may be sized to correspond with the bosses 131. According to one embodiment, the gaps 150 are narrower than the widths in the circumferential direction of the bosses 131. Thus, in order to engage the shroud 114 with the box 110, the gaps 150 should be aligned with bosses 131 and the gaps 152 should be aligned with bosses 141. This arrangement creates a clocking engagement, wherein the shroud 114 can be attached to the box 110 when the angular arrangement between them is such that shroud mounting holes 146 align with shroud mounting holes 140 and standoff holes 144 align with the standoff holes 130. Referring to FIG. 3a, a detailed view of a portion of the box 110 is shown. More specifically, a boss 131 with standoff hole 130, and a boss 141 with a shroud mounting hole 140 are shown. Referring to FIG. 3b, a detailed view of a portion of the shroud 114 is shown. More specifically, a shroud mounting hole 146 with ridges 148 separated by a gap 152 are shown. As shown in FIGS. 2a and 2b, screws 118 can fit through the shroud mounting holes 146 of the shroud 114 and engage with shroud mounting holes 140 of the box 110. The screws 118 may be self-threading screws that cut into the surface of shroud mounting holes 140. According to one embodiment, the screws 118 are #6-32 or #8-32 self-tapping screws. Alternatively, a threaded surface is provided on the inside of shroud mounting holes 140 and threaded screws 118 engage with that threaded surface. When installed on the box 110, the shroud 114 forms a flat surface extending outward from the box 110. Engagement of fan housing 103, seen in FIG. 1, with the surface of shroud 114 forms a decorative cover around the box 110 and a weatherproof connection between the fixture, here fan 102, and the box assembly 100.

As shown in FIG. 1, bracket 104 can be used to connect a fixture, here a ceiling fan, to the box assembly 100. The bracket 104, which is typically provided with the ceiling fan, includes mounting holes 170. The mounting holes 170 are separated by the same distance as the standoff holes 130 of the box 110. Screws 172, used to secure the bracket 104 to the standoffs 124, fit through the mounting holes 170 and engage with the standoffs 124 that are disposed within the standoff holes 130. Threading on the inner surface of the standoffs 124 corresponds to the threading of the screws 172. According to one embodiment, the screws 172 are #10-24 machine screws.

Figure 7:
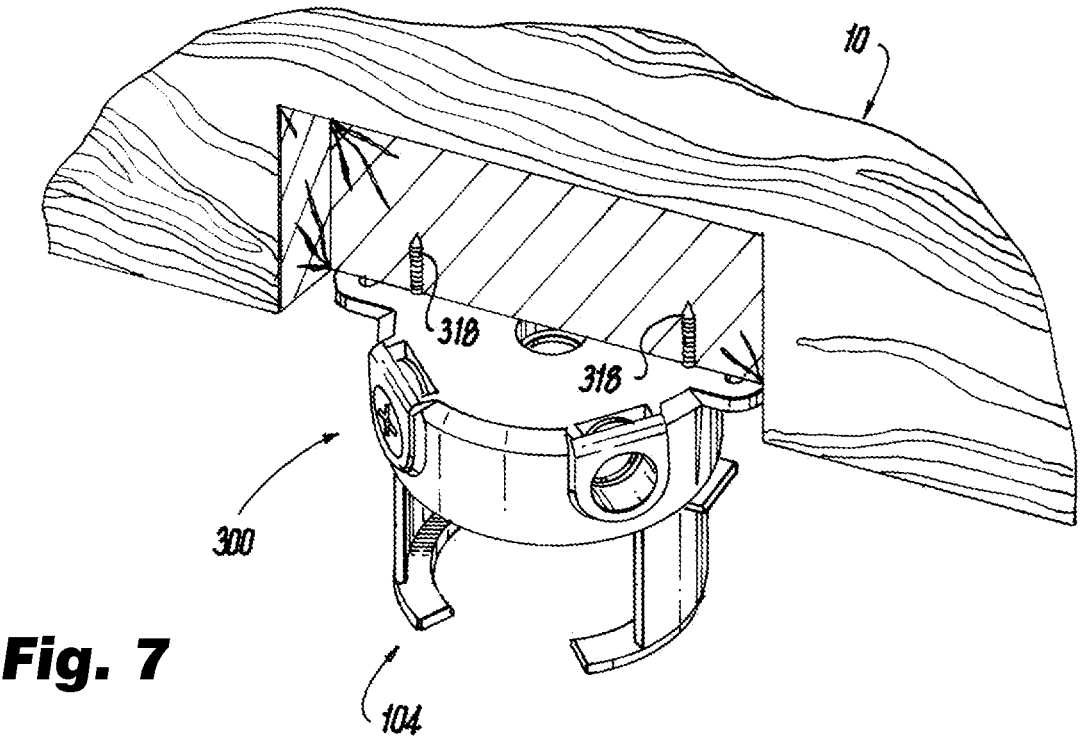
FIG. 7 is a perspective view of the electrical box and reinforcement member of the electrical box assembly of FIG. 1 secured to a ceiling joist.

Installation of a fan 102 using the electrical box assembly 100 according to one embodiment of the disclosure is as follows. An installer inserts the standoffs 124 of the reinforcement member 112 into the standoff holes 130, as shown in FIGS. 2a and 2b. The installer selects which openings 120, seen in FIG. 2c, of the box 110 are suitably positioned in relation to electrical conduits to which the box assembly 100 will be connected. The installer removes the appropriate plugs 119, if installed, or knockouts 115 to allow connection of the conduits to the box 110. The installer positions the box 110 with the reinforcement member 112 against the structure to which the fixture, here the ceiling fan 102, will be mechanically connected. As noted above, the structure the box 110 may be mounted to any suitable building structure, such as for example, the underside of a ceiling joist as seen in FIG. 7. The installer inserts the lag screws 116 through mounting holes 132 of box 110 and the mounting holes 128 of the reinforcement member 112 and drives the lag screws into the building structure securing the box 110 and the reinforcement member 112 to the building structure. The installer connects one or more conduits to the selected openings 120 in the box 110. Connection may be by way of threaded engagement of the conduit connectors with threaded surfaces of the openings 120, by friction fitting conduits into the openings 120, and/or by application of an adhesive to bond ends of conduits within the openings 120. The installer positions shroud 114 against the face 121 of box 110 and rotationally aligns the shroud 114 so that gaps 152 are aligned with bosses 141 and holes 146 of the shroud align with holes 140 of box 110. The installer affixes shroud 114 to box 110 using screws 118. The installer then connects the ceiling fan bracket 104 to the box assembly 100 by inserting screws 172 through mounting holes 170 in the bracket 104 and threading the screws into the standoffs 124 positioned within the standoff holes 130 of the box 110. The fixture, here the fan 102, can then be mounted to the bracket 104 according to methods known in the art.

According to another exemplary embodiment of the present disclosure, the shroud 114 may be omitted. Such a configuration may be used where the box assembly 100 is positioned so that the face 121 of the box 110 is flush with or recessed within a ceiling of a building. In this configuration, the bracket 104 is mounted to the standoffs 124 within standoff holes 130 by the screws 172 with the bracket 104 in direct contact with the face 121 of the box 110. A weatherproof connection is made between the fan housing 103 and the ceiling of the building.

Figure 5A:
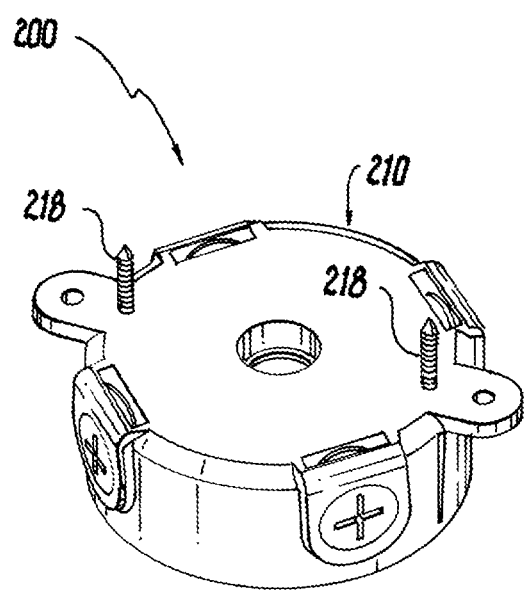
FIG. 5a is a lower perspective view of another exemplary embodiment of an electrical box assembly according to the present disclosure.
Figure 5B:
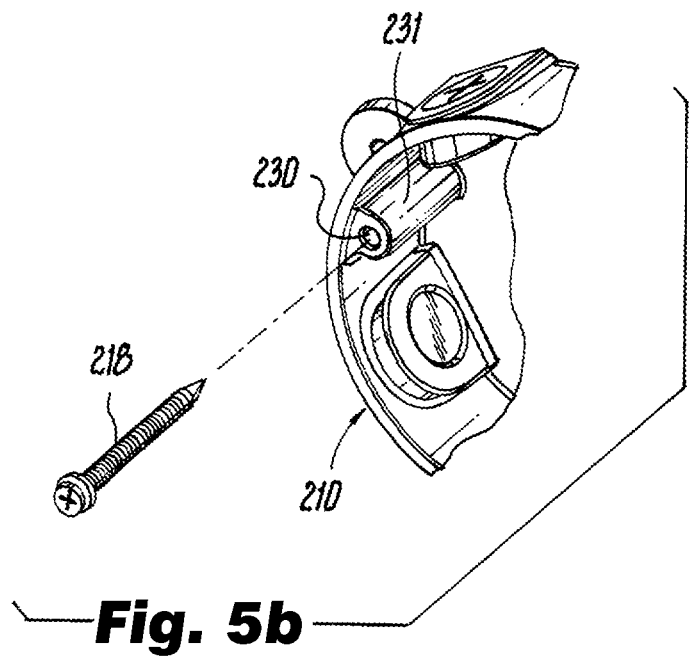
Figure 5C:
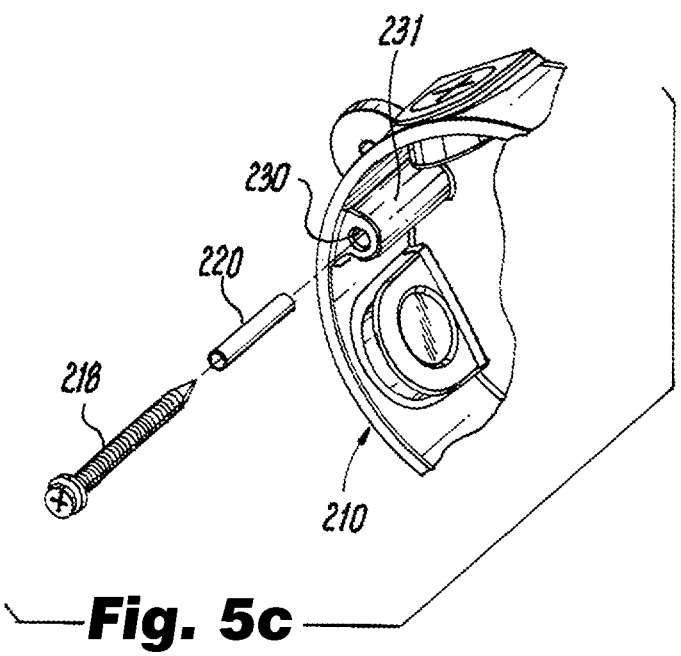
FIG. 5c is a detailed perspective view of another exemplary embodiment of the portion of the electrical box assembly of FIG. 5b.

Referring to FIGS. 5a and 5b, another exemplary embodiment of the box assembly 200 according to the present disclosure is shown. In this exemplary embodiment, the box 210 is provided with standoff holes 230 extending through bosses 231. According to this exemplary embodiment, to create a weatherproof connection with an installed fixture, a housing of the fixture would engage with the ceiling or other surface of the building. However, the shroud described above may be used with this box assembly. According to one embodiment, an insert, such as a metal insert, may be molded into the bosses 231 of the box 210 to form the standoff holes 230 to provide additional mechanical strength to the bosses. Lag screws 218 can then be passed through the standoff holes 230 so that the lag screws extend from the front of the box 210 through the back surface of box 210, as shown in FIG. 5a. When the box assembly is secured to a building structure, the lag screws 218 engage with the building structure, for example, a ceiling joist, to secure the box assembly to the building. In this embodiment, the lag screws 218 may also pass through and engage with the mounting holes 170 on the fan bracket 104 or other connecting feature on the fixture to be installed, to connect the fixture to the building structure. FIG. 5c shows another exemplary embodiment of the box assembly 200 according to the present disclosure, where metal inserts 220 are provided within the standoff holes 230. The inserts 220 provide additional rigidity to the bosses 231 so that the lag screws 218 can support the fixture.

Figure 6:
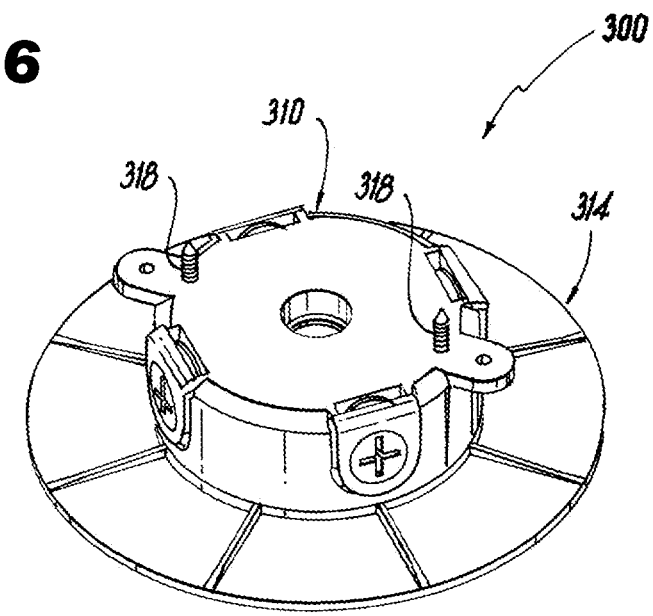
FIG. 6 is another exemplary embodiment of an electrical box assembly according to the present disclosure.

FIG. 6 shows another exemplary embodiment of the box assembly according to the present disclosure. In this embodiment, the box assembly 300, which is similar to the box assembly of FIGS. 5a-c, with lag screws 318 extending through box 310 and out the upper surface of the box to engage with a building structure. In this embodiment, a shroud 314 is fitted to the face of box 310 to provide a weatherproof engagement with the housing of a fan.

Figure 9:
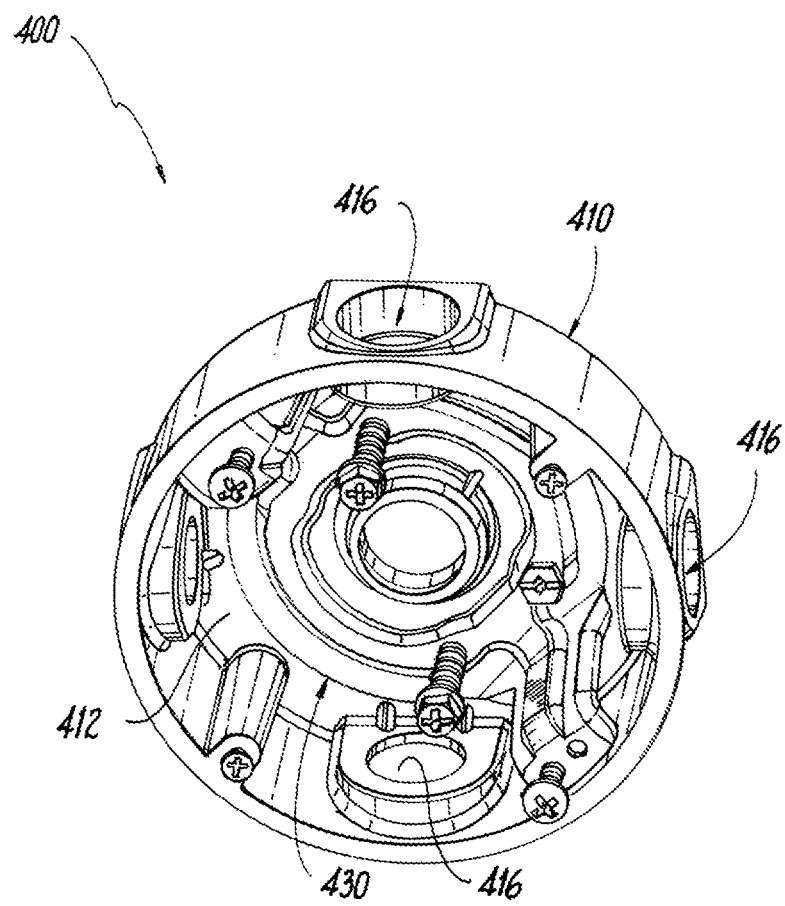
FIG. 9 is a perspective view of the electrical box assembly of FIG. 8, illustrating an interior of another exemplary embodiment of an electrical box having a reinforcement member positioned within the electrical box.
Figure 10:
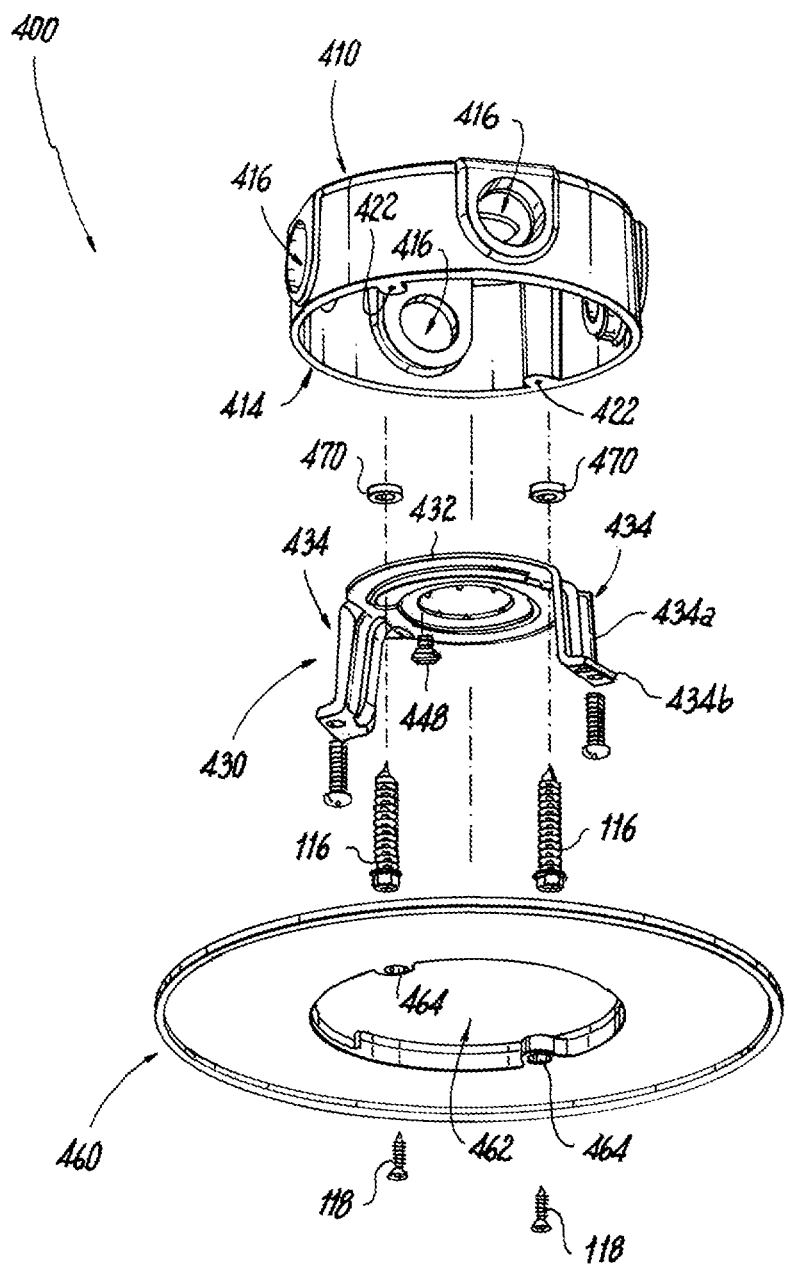
FIG. 10 is a lower perspective view with parts separated of the electrical box assembly of FIG. 9, illustrating the reinforcement member that fits within the electrical box and an optional shroud.

Referring to FIGS. 8-15, another exemplary embodiment of a box assembly according to the present disclosure is shown. Similar to the above described embodiments, a fixture 102 is connected by a bracket 104 with the electrical box assembly 400 according to this exemplary embodiment. The box assembly 400 includes a box 410, e.g., a molded polymer box, a reinforcement member 430 configured to be positioned within the box 410, and an optional shroud 460, as seen in FIG. 10. Lag screws 116, seen in FIG. 10, can pass through holes in the box 410 and reinforcement member 430 and are provided to connect the box assembly 400 to a building structure 10, as will be described below. Screws 118, seen in FIG. 10, connect the shroud 460 to the electrical box 410. Generally, the box assembly 400 is secured to a building structure 10, e.g., a ceiling joist seen in FIG. 8, to fix the position of the electrical box 410 relative to the building structure, to support the fixture 102 and to facilitate electrical connections to the fixture.

Figure 11:
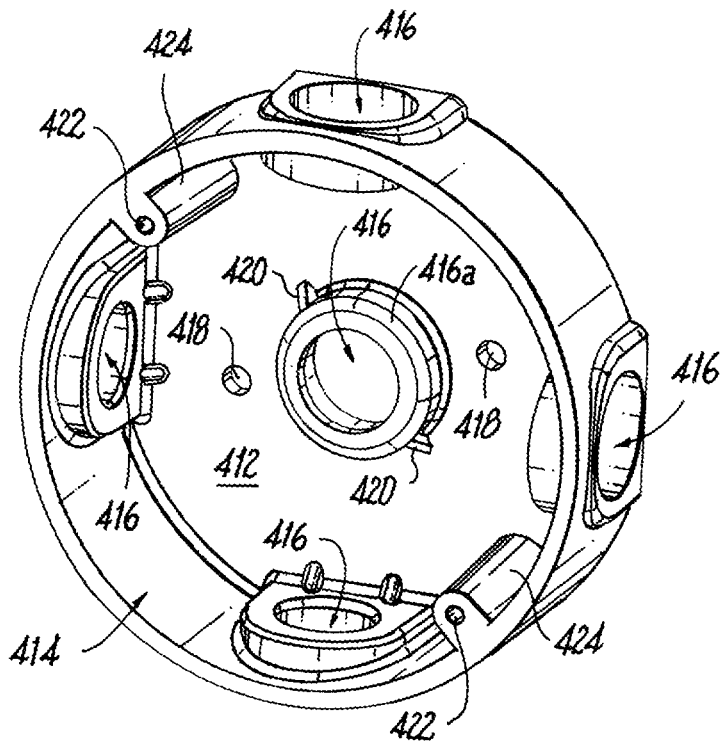
FIG. 11 is a perspective view of the electrical box of FIG. 10.
Figure 12:
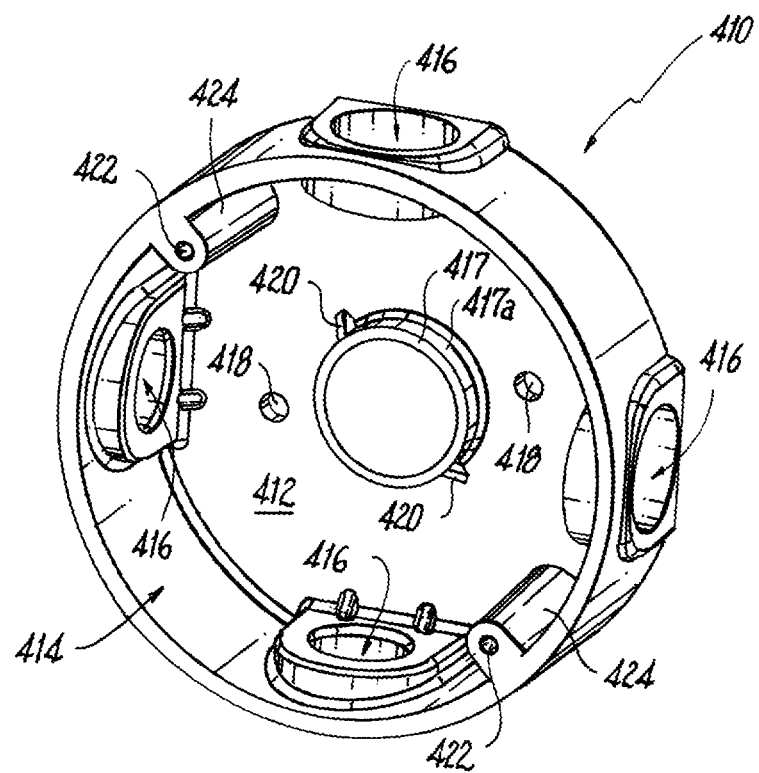
FIG. 12 is a perspective view of another exemplary embodiment of an electrical box according to the present disclosure.
Figure 15:
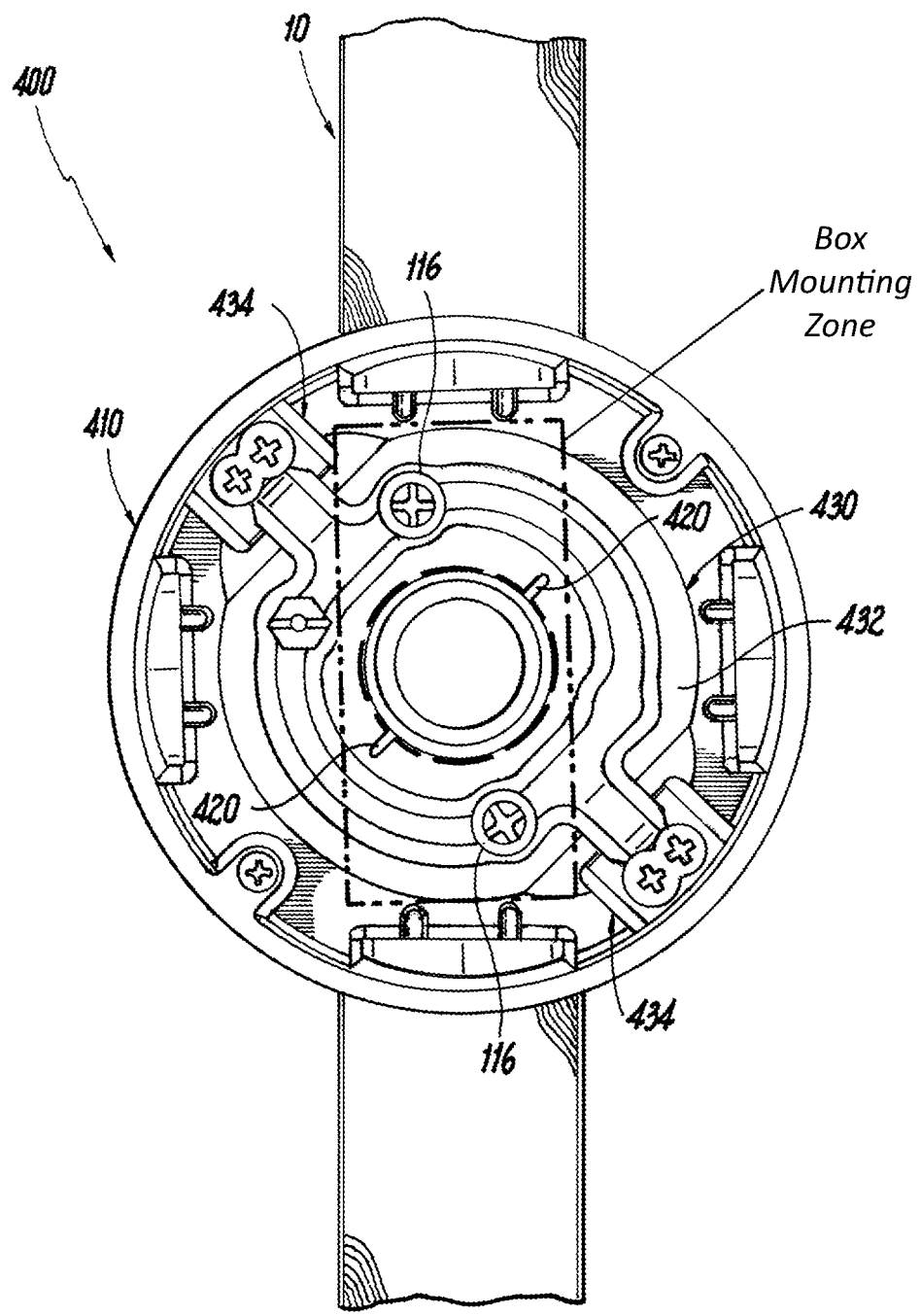
FIG. 15 is a top plan view of the electrical box assembly of FIG. 8 connected to a building structure and illustrating a mounting zone of the electrical box and lag screws in the mounting zone securing the electrical box assembly to the building structure.
Figure 16:
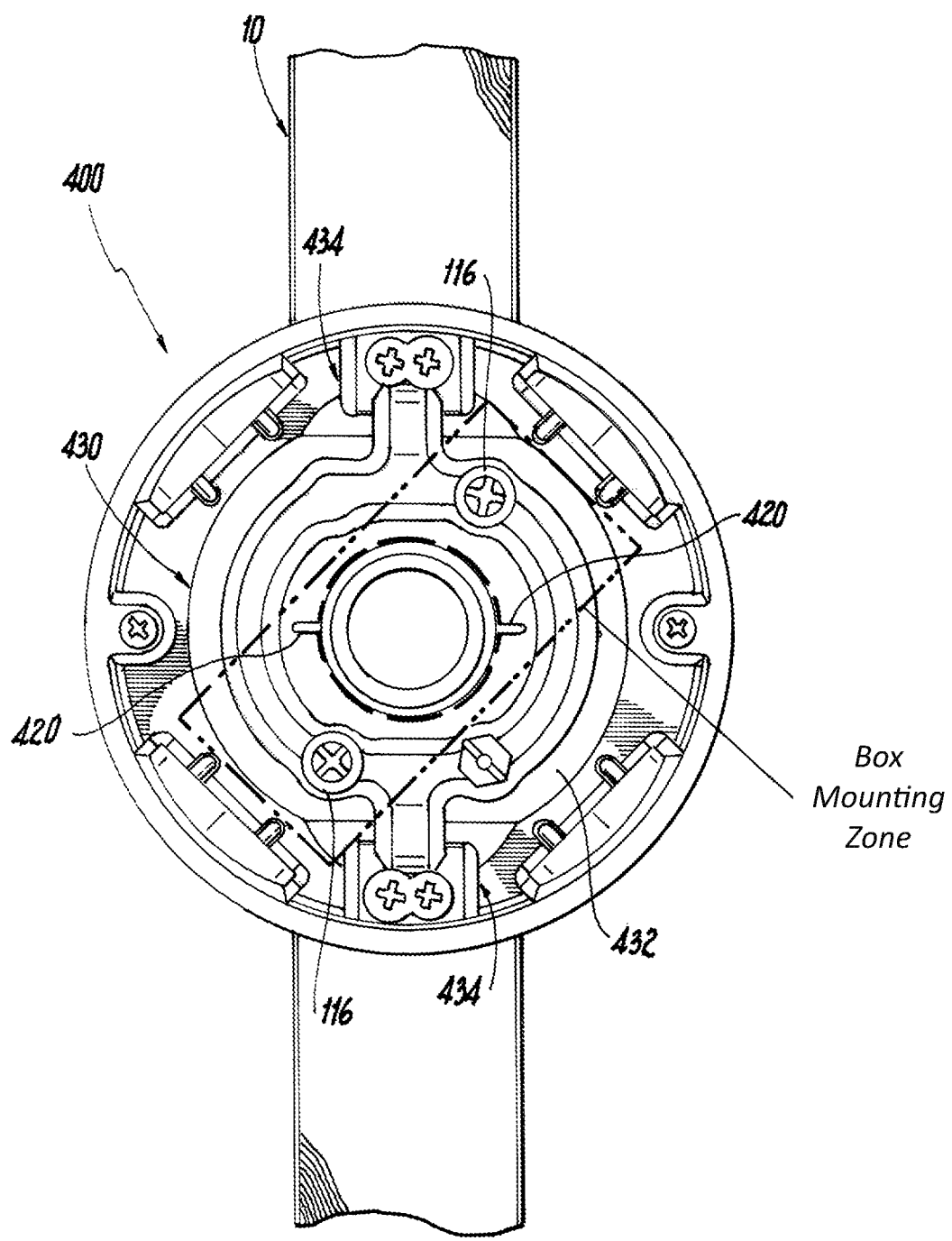
FIG. 16 is a top plan view of the electrical box assembly connected to a building structure similar to FIG. 15 and illustrating the mounting zone rotated about forty-five degrees and lag screws in the mounting zone securing the electrical box assembly to the building structure.

As shown in FIGS. 9 and 11, the box 410 includes a bottom wall 412 and a face 414 that is open allowing an installer access to the inside of the box 410 during installation. The box 410 also includes one or more conduit openings 416 used to create a weatherproof connection between the box 110 and an electrical conduit 12, seen in FIG. 8. The conduit openings 416 may be provided at various locations on the box 410 to facilitate convenient connection with conduits in a number of directions. The conduit openings 416 are similar to the embodiments of conduit openings 120 described above and for ease of description are not repeated. The bottom wall 412 of the box 410 includes mounting holes 418 used when securing the box assembly 400 to a building structure. The mounting holes 418 are preferably positioned on opposite sides of a conduit opening 416 in the bottom wall of the box 410 within a box mounting zone, which is generally referenced in FIGS. 15 and 16. Generally, the box mounting zone is for reference and has a width that at least covers the width of a typical building structure joist, such as a ceiling joist. For general reference, the width of a typical 2"×10" ceiling joist is from about 1½" and about 2". The length of the box mounting zone can extend from one side of the box an opposite side of the box 410, or any length that is less than extending from one side of the box an opposite side of the box. By positioning the mounting holes 418 in the box mounting zone, the box 410 can be rotated a predetermined number of degrees while still being positioned so that the lag screws 116 can grip the building structure 10. The predetermined number of degrees depends upon the width of the building structure 10 the box 410 will be secured to. As a non-limiting example, if the building structure 10 is a 2"×10" ceiling joist, the predetermined number of degrees would be about 45 degrees. More specifically, if the box were set in a first position, as shown in FIG. 15, the lag screws 116 would be in a position to grip the 2"×10" ceiling joist, and if the box 410 were rotated 45 degrees to a second position, as shown in FIG. 16, the lag screws 116 would still be in a position to grip the 2"×10" ceiling joist.

Continuing to refer to FIGS. 9 and 11, the conduit opening 416 in the bottom wall 411 has a raised wall 416a extending into the interior of the box 410 and a pair of ribs 420 are positioned around the perimeter of the raised wall 416a of the conduit opening 416 as shown. The ribs 420 are used to provide a key for mounting the reinforcement member 430 as described below. In another exemplary embodiment, shown in FIG. 12, the bottom wall 412 of the box 410 may have a boss 417 instead of the conduit opening 416. The boss 417 has a raised wall 417a extending into the interior of the box 410 and a pair of ribs 420 are positioned around the perimeter of the raised wall 417a of the boss 417 as shown. As noted above, the ribs 420 are used to provide a key for mounting the reinforcement member 430 as described below. The box 410 may also include shroud mounting holes 422 formed in bosses 424. According to one embodiment, the ends of the bosses 424 are flush with the face 414 of the box 110.

According to an exemplary embodiment, the box 410 is formed from a moldable non-conductive or electrically insulating material. A non-limiting example of a moldable non-conductive or electrically insulating material is plastic. Non-limiting examples of suitable plastic materials include moldable polymer resin, such as polyvinyl chloride (PVC), nylon, polyethylene terephthalate (PET), polybutylene terephthalate (PBT), and the like.

Figure 13:
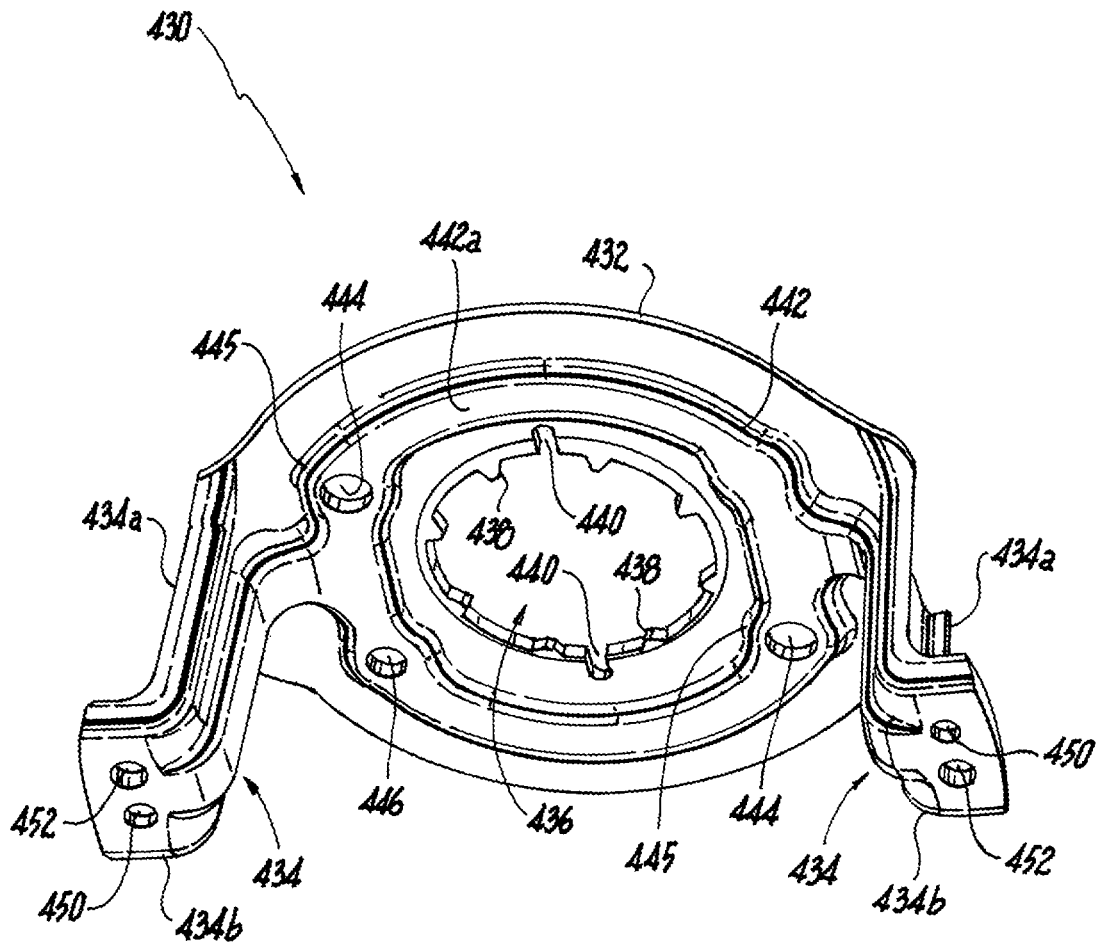
FIG. 13 is a perspective view of the reinforcement member of FIG. 10.
Figure 14:
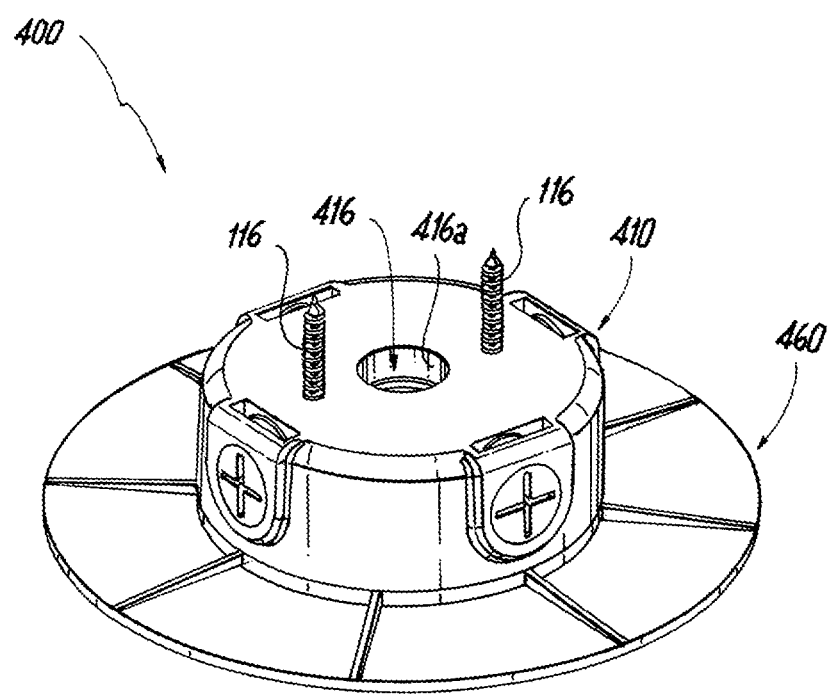
FIG. 14 is an upper perspective view of the electrical box assembly of FIG. 9, illustrating the optional shroud attached to the electrical box.

Referring now to FIGS. 10 and 13, another exemplary embodiment of a reinforcement member according to the present disclosure is shown. The reinforcement member 430 includes panel 432 and one or more standoffs 434 extending from the panel. In the exemplary embodiment shown, the panel 432 is circular in shape to conform to the circular shape of the box 410. However, the present disclosure contemplates panels 432 having different shapes including square and rectangular shapes to conform to square and rectangular boxes, respectively. The panel 432 may be made of a metal or metal alloy, such as steel, aluminum, copper, brass, bronze, and the like. According to one embodiment, the panel 432 is formed from 0.045" cold-rolled steel. The panel 432 includes an opening 436 having a diameter sufficient to receive the conduit opening 416 in the bottom wall 412 of the box 410. Around the perimeter of the opening 436 are one or more projections 438 that are preferably spaced apart as shown in FIG. 13. The projections 438 are provided to engage the raised wall 416a of the conduit opening 416 to temporarily hold the reinforcement member 430 in position when mounting the box assembly 400 to a building structure. Around the perimeter of the opening 436 are one or more key slots 440 that are configured to receive the ribs 420 on the raised wall 416a of the conduit opening 416 in the bottom wall 412 of the box 410. By aligning the ribs 420 with the slots 440 the reinforcement member 430 can be properly aligned within the box 410 as described below. It is noted that the boss 417, seen in FIG. 12, in the bottom wall 412 of the box 410 may be substituted for the conduit opening 416 in the bottom wall of the box with similar results as described above.

The panel 432 may include a raised surface or rib 442 surrounding the opening 436 and extending along the standoffs 434, as shown in FIG. 13. The raised surface or rib 442 provides stiffness to the reinforcement member 430. The raised surface or rib 442 may include a flat top surface 442a that includes mounting holes 444 that are used when mounting the box 410 to a building structure. The mounting holes 444 are positioned on the rib 442 so that they align with the mounting holes 418 in the bottom wall 412 of the box 410 when the reinforcement member 430 is positioned within the box 410 and the slots 440 of the panel 432 are aligned with the ribs 420 on the conduit opening 416. Around the mounting holes 444 in the rib 442, the rib expands to form a gasket cradle 445. The gasket cradles 445 are configured to receive a sealing gasket or washer as described below. The rib 442 may include a grounding hole 446 with a grounding screw 448, seen in FIG. 10, used to ground the reinforcement member 430. The grounding screw 448 may be self-threading screw that cuts into the surface of the grounding hole 448. According to one embodiment, the grounding screw 448 is a #8-32 self-tapping screw color coded green.

According to one embodiment, the panel 432 may be stamped from a sheet of material and the mounting holes 444 can be formed as part of the stamping process. The rib 442 can also be formed as part of the stamping process.

Continuing to refer to FIGS. 10 and 13, the standoffs 434 may be made of a metal or metal alloy, such as steel, aluminum, copper, brass, bronze, and the like and may be made from the same material as the panel 432 or from a different material. In one exemplary embodiment, the standoffs 434 are integrally formed with the panel 432 to form a monolithic structure. In another exemplary embodiment the standoffs 434 can be connected to the panel 432 by mechanical fasteners, such as welding, riveting, or screwing the standoffs 434 to the panel 432, or using adhesive fasteners. The standoffs 434 include an arm 434a extending from the panel 432 and a connecting leg 434b extending substantially perpendicular to the arm 434a. The standoffs 434 are provided to facilitate the transfer of the load of a fixture to be mounted to the box 410 through the reinforcement member 430 and ultimately to the building structure the box assembly 400 is secured to. The connecting legs 434b of the standoffs 434 include connecting holes 450 and 452 that are used to mount the fixture to the reinforcement member 430 and thus to the box 410. The connecting holes 450 are threaded and configured to receive one size screw used to mount the fixture to the reinforcement member 430, such as a #8-32 machine screw, and connecting holes 452 are configured to receive another size screw used to mount the fixture to the reinforcement member 430, such as a #10-24 machine screw. It is noted that the connecting holes can be configured to receive any type of screws.

Referring again to FIG. 10, the shroud 460 forms an annular ring with an opening 462. The opening 462 is shaped to correspond with the open face 414 of the box 410. Arranged around the opening 462 are shroud mount holes 464 that are positioned and configured to align with the shroud mounting holes 422 formed in bosses 424 in box 410. As noted above, the screws 118 are used to connect the shroud 460 to the shroud mounting holes 422.

As shown in FIG. 8, bracket 104 can be used to connect a fixture 102, here a ceiling fan, to the box assembly 400. The bracket 104, which is typically provided with the ceiling fan, includes mounting holes 170. The mounting holes 170 are separated by the same distance as the connecting holes 450 or 452 of the reinforcement member 430 of the box assembly 400. Screws 172, used to secure the bracket 104 to the connecting holes 450 or 452, fit through the mounting holes 170 and engage with the connecting holes 450 or 452 that are disposed in the connecting leg 434b of the reinforcement member 434. The connector hole 450 or 452 threading corresponds to the threading of the screws 172.

According to one embodiment, the screws 172 can be, for example, #10-24 machine screws.

Referring to FIGS. 8 and 10, an exemplary method for installing the electrical box assembly 400 and a fixture 102, which in this example is a ceiling fan, according to the present disclosure is as follows. An installer positions a gasket 470 into each gasket cradle 445 in the reinforcement member 430 so that the gaskets 470 are aligned with the mounting holes 44 in the reinforcement member. The installer inserts the reinforcement member 430 and gaskets 470 into the box 410 so that the ribs 420 on the conduit opening 416 on the bottom wall 412 of the box 410 are received in slots 440 of the panel 432. At this point, the protrusions 438 of the opening 436 in the panel 432 engage the raised wall 416a of the conduit opening 416 to temporarily hold the reinforcement member 430 in position relative to the box 410 allowing the installer time to secure the box assembly 400 to the building structure 10. The installer selects which conduit openings 416 of the box 410 are suitably positioned in relation to electrical conduits to which the box assembly 400 will be connected. The installer removes the appropriate plugs or knockouts to allow connection of the conduit or conduits 12 to the box 410, as seen in FIG. 8. The installer positions the box 410 with the reinforcement member 430 against the building structure 10 to which the fixture 102 will be mechanically connected. As noted above, the building structure to which the box 410 may be mounted to may be any suitable building structure 10, such as for example, a ceiling joist. The installer inserts the lag screws 116 through mounting holes 444 of the reinforcement member 430 and the mounting holes 418 of the box 410, seen in FIGS. 9, 11 and 14, and drives the lag screws into the building structure 10 securing the box 410 and the reinforcement member 430 to the building structure. At this point, the gaskets 470, which are used in weatherproof applications, seal the mounting hole 418 in the box 410 and the lag screw 116.

The installer then connects one or more conduits to the selected conduit openings 416 in the box 410. Connection of the conduit 12 to the conduit openings 416 may be by way of threaded engagement of conventional conduit connectors (not shown) with threaded surfaces of the conduit openings 416, by friction fitting conduits into the conduit openings 416, and/or by application of an adhesive to bond ends of conduits within the conduit openings 416. If the optional shroud is to be used, the installer positions the shroud 460 against the face 414 of the box 410 and aligns the shroud mounting holes 464 of the shroud 460 with the shroud mounting holes 422 in bosses 424 in the box 410. The installer affixes the shroud 460 to box 410 using screws 118. The installer then connects the ceiling fan bracket 104 to the reinforcement member 430 by inserting screws 172 through connecting holes 450 or 452 in connecting leg 434b of the reinforcement member 430. The fixture 102, here the ceiling fan, can then be mounted to the bracket 104 and the electrical connections made to the ceiling fan according to methods known in the art.

While illustrative embodiments of the present disclosure have been described and illustrated above, it should be understood that these embodiments are exemplary and are not to be considered as limiting. Additions, deletions, substitutions, and other modifications can be made without departing from the spirit or scope of the present disclosure. Accordingly, the present disclosure is not to be considered as limited by the foregoing description.

What is claimed is:

1. A reinforcement member for use with an electrical box for supporting an electrical fixture, the reinforcement member comprising: a panel, the panel being shaped to conform to at least a portion of a bottom wall of the electrical box so that the panel can be positioned adjacent to the bottom wall of the electrical box, the panel including at least one raised rib used to increase stiffness of the panel, the panel extending along the bottom wall of the electrical box from about one side of the electrical box to about an opposite side of the electrical box and the panel being at least partially in contact with the bottom wall of the electrical box; and one or more standoffs, each of the one or more standoffs having a first end extending from the panel and a second end away from the panel, the second end away from the panel configured to receive a fastener for connecting the electrical fixture.

2. The reinforcement member according to claim 1, further comprising at least one connecting hole at the second end of each of the one or more standoffs configured to receive the fastener for connecting the electrical fixture.

3. The reinforcement member according to claim 1, wherein the panel is shaped to conform to at least a portion of the bottom wall of the electrical box so that the panel can be positioned within the electrical box.

4. The reinforcement member according to claim 3, wherein the first end of each of the one or more standoffs is attached to the panel.

5. The reinforcement member according to claim 4, wherein the first end of each of the one or more standoffs is monolithically formed into the panel.

6. The reinforcement member according to claim 1, further comprising a bore extending from the first end to the second end of each of the one or more standoffs so that the fastener can pass at least partially through the standoff.

7. The reinforcement member according to claim 6, wherein each of the one or more standoffs and the bores extend substantially perpendicular to the panel.

8. The reinforcement member according to claim 7, wherein when the reinforcement member is positioned with respect to the bottom wall of the electrical box, the second end of each of the plurality of standoffs pass through the bottom wall of the electrical box and are accessible from the front face.

9. The reinforcement member according to claim 1, wherein the bottom wall of the electrical box includes a mounting zone having a plurality of box mounting holes.

10. The reinforcement member according to claim 9, wherein the panel has a plurality of panel mounting holes that are positioned to align with the box mounting holes such that one box mounting hole aligns with one panel mounting hole when the panel is positioned within the electrical box adjacent the bottom wall.

11. The reinforcement member according to claim 1, wherein the reinforcement member is formed from a metal or metal alloy.

12. The reinforcement member according to claim 1, further comprising a shroud, the shroud being configured to be positioned with respect to a front face of the electrical box.

13. The reinforcement member according to claim 12, wherein the electrical box comprises a first mating surface on an open front face and the shroud comprises a corresponding second mating surface, and wherein when joined the first and second mating surfaces create a weatherproof engagement.

14. A reinforcement member for use with an electrical box, the reinforcement member comprising: a reinforcement member having a panel and one or more standoffs, the panel being shaped to conform to at least a portion of the bottom wall of the electrical box so that the panel can be positioned adjacent the electrical box, the panel extending along the bottom wall from about one side of the electrical box to about an opposite side of the electrical box and the panel being at least partially in contact with the bottom wall, the panel including at least one raised rib used to increase the stiffness of the panel, and each of the one or more standoffs extending from the panel and ending in a free end configured to receive a fastener for connecting the fixture.

15. The reinforcement member according to claim 14, wherein the bottom wall of the electrical box includes a mounting zone having a plurality of box mounting holes.

16. The reinforcement member according to claim 15, wherein the panel has a plurality of panel mounting holes that are positioned to align with the box mounting holes such that one box mounting hole aligns with one panel mounting hole when the panel is positioned adjacent the bottom wall of the electrical box.

17. The reinforcement member according to claim 14, wherein the reinforcement member is formed from a metal or metal alloy.

18. The reinforcement member according to claim 14, further comprising a shroud configured to be positioned with respect to a front face of the electrical box.

19. The reinforcement member according to claim 18, wherein the electrical box comprises a first mating surface on an open front face and the shroud comprises a corresponding second mating surface, and wherein when joined the first and second mating surfaces create a weatherproof engagement.

20. The reinforcement member according to claim 14, wherein each of the one or more standoffs comprise an arm extending from the panel and a connecting leg at the free end, the connecting leg being substantially perpendicular to the arm and having the at least one connecting hole.

* * * * *